Aug. 7, 1951    J. R. BENFORD    2,563,702
MICROSCOPE FINE ADJUSTMENT MECHANISM
Filed Feb. 10, 1948
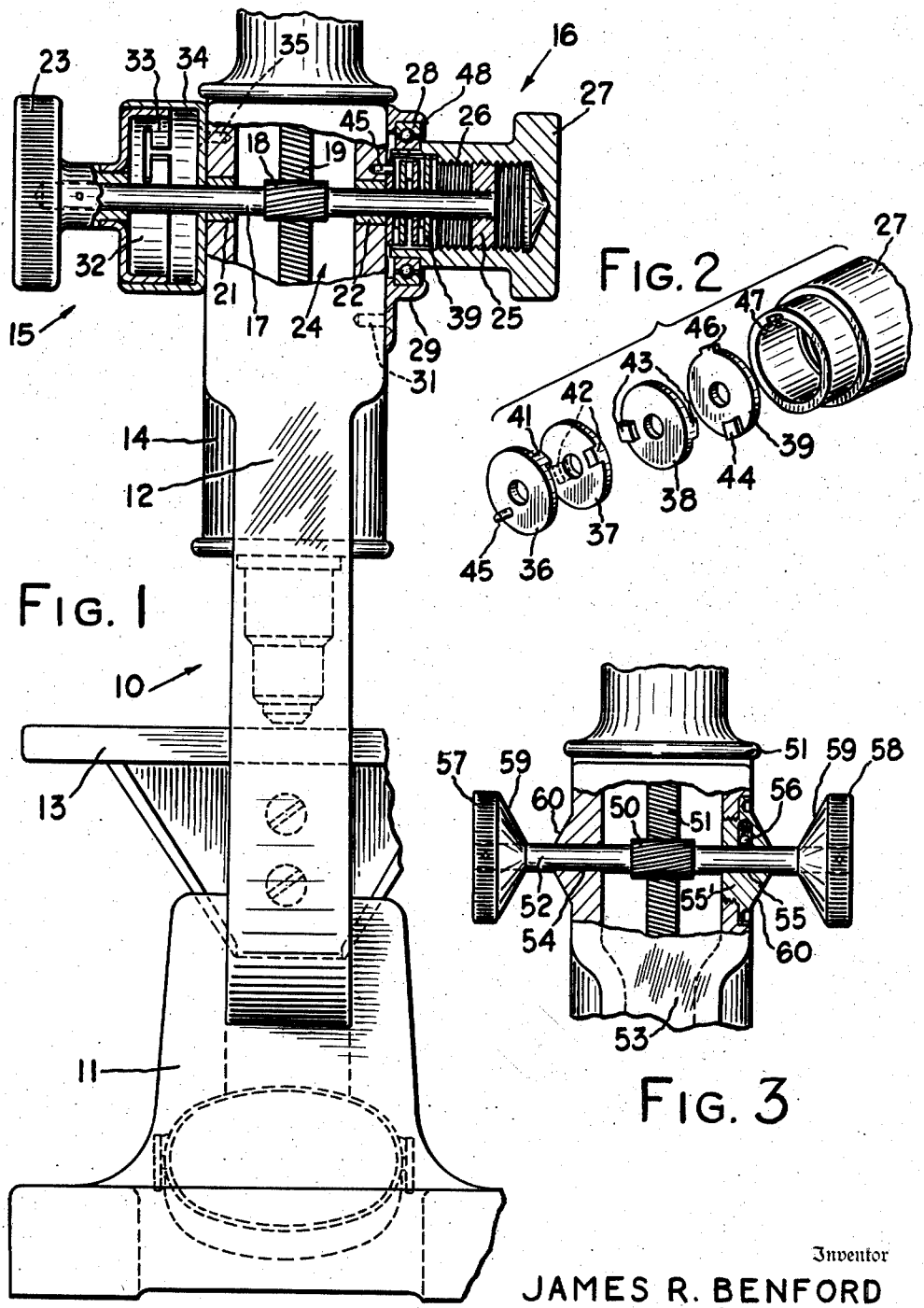
Inventor
JAMES R. BENFORD
By
Attorney Patented Aug. 7, 1951

2,563,702

UNITED STATES PATENT OFFICE 2,563,702

MICROSCOPE FINE ADJUSTMENT MECHANISM

James R. Benford, Irondequoit, N. Y., assignor to Bausch & Lomb Optical Company, Rochester, N. Y., a corporation of New York Application February 10, 1948, Serial No. 7,402

2 Claims. (Cl. 88—39)

This invention relates to microscopes and more particularly to improvements in the fine adjustment mechanism for the optical system thereof.

One of the objects of this invention is to provide a fine adjustment mechanism which is relatively simple in structure yet efficient in operation. A further object is to provide such a device which may be readily and easily manufactured and adjusted with a minimum of labor and expense. Still another object is to provide in a microscope a mechanism in which certain parts are used in common to effect both coarse and fine adjustments. These and other objects and advantages reside in certain novel features of construction, arrangement and combination of parts as will hereinafter be more fully described and pointed out in the appended claims.

Fig. 1 is a fragmentary view of a microscope stand, with parts in section, showing a preferred form of the invention, Fig. 2 is an exploded view in perspective of certain details of the invention, and Fig. 3 is a fragmentary view partly in section of a second embodiment of this invention.

This invention is applied to a microscope, generally indicated at 10 in Fig. 1 of the drawing, having a base 11, a support arm 12 suitably held thereon and a specimen stage 13 and lens tube 14 secured to the support arm 12 in substantial alignment with each other. The lens tube 14, which supports the optical system, is slidably mounted on slideways, not shown, for focusing said optical system. Although the preferred form of the invention shows the device applied to the movable lens tube 14, it may equally well be used to accomplish fine focusing movements of any movable member on the microscope such as the stage, the mechanical stage, or a substage condenser.

According to this invention, movement of the lens tube 14 is produced by a coarse adjustment mechanism 15 and a fine adjustment mechanism 16 having in common an operating shaft 17 and a helical pinion 18 fixed to the shaft and meshing with a mating inclined tooth rack 19 which is fixed to the lens tube. The operating shaft 17 is rotatably and slidably journaled in bushings 21 and 22 within the support arm 12 so that the pinion 18 is traversable across the face of the rack 19. Knob 23 is fixed to one end of shaft 17 so that the latter may be turned to effect a coarse adjustment of lens tube 14 through the coaction of the rack 19 and pinion 18.

The fine focusing adjustments of the lens tube 14 are accomplished by moving the operating shaft 17 axially, without rotation, so as to utilize the camming action of the meshed inclined gear teeth on the helical pinion 18 and rack 19 to move the tube 14. It is important that sufficient clearance be provided between the ends of the pinion 18 and the side walls of the pinion chamber 24 so that the pinion can be moved a total distance of substantially twice its length for best operating effect.

Actuating means of any desired form for moving the pinion 18 and shaft 17 axially may be provided such as an exteriorly threaded shaft head 25 fixed in any suitable manner to the outer end of the shaft 17 and engaged with an interior thread 26 in a fine adjustment operating knob 27. Since it is desirable to have the knob 27 turn freely and not move axially when the coarse adjustment mechanism 15 is in operation, a combination antifriction and antithrust bearing 28 is used as a rotatable mounting means for the knob 27. Bearing 28 is held in any desired manner such as a friction fit on the knob 27 and is concentrically fixed with respect to the shaft 17 on the support arm 12 by a retaining collar 29 and screws 31.

To facilitate operation of the fine adjustment mechanism, frictional drag means of any desired form may be provided to prevent rotation of shaft 17 due to the rotational component of force produced when an axial force is applied to the shaft 17. The frictional drag means here shown comprises an annular retarder member 32 having spring fingers 33 thereon and is attached to the shaft 17. The spring fingers 33 contact the inner surface of a stationary annular member such as a brake drum 34 fixed in any suitable manner such as by screws 35 to the support arm 12 to complete the drag means. It is necessary that the rotational retarding force produced by the frictional drag member be substantially in excess of the rotational force produced in the shaft 17 due to the reaction between the helical elements on pinion 18 of the rack 19 as the shaft 17 is moved axially.

Stop mechanism of any effective form may be provided for limiting the axial travel of the shaft 17. As here shown, a multi-turn stop mechanism connected between the operating knob 27 and the stationary support arm 12 accomplishes the limiting function. Said mechanism includes the contiguous stop disks 36, 37, 38, and 39 carried loosely on the shaft 17 and having limited rotational freedom therebetween. Rotational limitation may be effected in any desired manner such as the interengaging drive lugs or abutments 41, 42, 43, and 44 on the disks 36—39, respectively, which rotationally engage each other in an obvious manner. In disk 36 is fixed an anchor pin 45 which enters a corresponding hole in the stationary arm 12. A radial lug 43 on the periphery of disk 39 slidably engages an interior slot 47 in the knob 27 to connect the active end of the stop means to said knob.

In assembling this device, the stop disks 36—39 and bushing 22 are first placed in proper order on the fine adjustment end of the shaft 17 and the threaded head 25 is then suitably fixed on the end of the shaft. The coarse adjustment end of the shaft is then inserted from the right side into bushing 21 and subsequently bushing 22 is pressed into the support arm 12 and the anchor pin 45 is inserted into a hole in the arm 12. The bearing 28 is now pressed on the end of the knob 27 and the outer diameter of the bearing 28 is fitted within the retaining collar 29 wherein it is held by spinning over the outer edge of the collar at 48. The two subassemblies resulting from the above operations are then asembled together by inserting the radial lug 46 in the interior slot 47 and turning the knob 27 until the shaft head 25 is sufficiently engaged within the interior thread 26 to allow the retaining collar 29 to lie against the arm 12 where it is secured by the screws 31. Finally the brake drum 34 is slipped over the shaft 17 and secured to the arm 12 by screws 35 and the knob 23 having the spring retarder member 32 fixed thereon is secured to the shaft.

In operating this embodiment of this invention, a rotation force great enough to overcome the static friction of the frictional retarder member 32 is applied by the operator to the coarse adjustment knob 23 to rotate the pinion 18 in the usual manner to move the lens tube 14. During rotation of the shaft 17 by coarse adjustment knob 23, the friction between the head 25 and knob 27 causes the latter to rotate freely together with the head on its antifriction bearing 28. Rotation of the fine adjustment knob 27 causes the head 25 to move along the interior thread 26 since the shaft 17 is restrained from rotating by the retarder member 32. Consequently, the shaft head 25 carries the helical pinion 18 transversely across the inclined tooth rack 19 without rotating to move the lens tube 14 by the camming action of the inclined teeth. The resulting rotational component of force imparted to the shaft 17 by the inclined teeth is canceled by the braking force of the retarder member 32.

In the second embodiment of the invention illustrated in Fig. 3, the operating principle of the first embodiment is utilized in a simplified device for moving an adjustably mounted member of the microscope such as a lens tube, stage, mechanical stage, or substage condenser. As here shown, a helical pinion 50, meshed with an inclined tooth rack 51 on lens tube 51', is fixedly mounted on a rotatable and axially movable shaft 52 journaled in a support arm 53 at 54 and 55 with a sliding fit. The journal bearing 55 is formed in a block 55' which is threaded into arm 53 so as to facilitate assembly. A frictional retarder 56 of any desired form for opposing motion of the shaft 52, as shown in Figure 3, may be provided. At the ends of the shaft 52, operating members such as knobs 57 and 58 are attached for turning the shaft. For a purpose to be described hereinafter, the inner portions of knobs 57 and 58 are provided with the frusto-conical surfaces 59 and the portions of the arm adjacent the knobs are also provided with the frusto-conical surfaces 60.

In operating the modification shown in Fig. 3, the coarse adjustment is effected in the usual manner by turning the shaft 52 by means of knob 57 or 58. In order to produce fine adjustments with this simplified form of the invention, the tips of the operator's thumbs and forefingers are placed in the V-shaped recesses formed by the respectively adjacent tapered surfaces 59 and 60. By pressing the fingers into the recess on one side of arm 53, the shaft 52 will be moved axially in one direction and by pressing the fingers into the recess on the other side of the arm 53 the shaft 52 will be moved axially in the opposite direction. Such axial movements of the shaft 52 will cause the helical pinion 50 to exert a camming action on the rack 51 and thereby produce relatively minute movements of the lens tube 51'.

In the above-described disclosures, it will be seen that there are here provided simple and compact coarse and fine adjustment mechanisms which interact smoothly and efficiently through a helical pinion and rack connection to move an adjustable part of a microscope through very fine increments all in accordance with the objects of this invention.

Although but certain forms of this invention have been shown and described in detail, it will be understood that still other forms are possible and changes may be made in the arrangement of parts and substitutions may be made therein without departing from the spirit of the invention as defined in the appended claims.

I claim:

1. In a microscope having a support carrying a lens member and a stage member and having at least one of said members movable relative to the other, the combination of a rack carried by the movable member, a shaft mounted for rotational and axial movement on the support, helical gear means operatively connecting the shaft to the rack, means for rotating the shaft to effect coarse adjustments of the movable member, and means for moving the shaft axially to effect fine adjustments of the movable member, said last-named means comprising a head fixed on said shaft and a rotatable, axially-immobilized operating member coaxially threaded to said head so that rotation of the operating member causes the head and shaft to travel axially thereof.

2. In a microscope having a support carrying a lens tube which is slidable thereon, the combination of a rack carried by the lens tube, a shaft mounted for rotational and axial movement on the support, a helical pinion fixed to the shaft and in operative engagement with the rack, means for rotating the shaft to effect coarse adjustment of the lens tube, a threaded head fixed to the shaft, an operating member which is rotatably mounted on the support and held against axial movement, said operating member and head being in threaded engagement whereby rotation of the operating member moves the shaft axially to effect fine adjustment of the lens tube, a plurality of inter-engageable stop members mounted on the shaft for operative engagement with the operating member and the support whereby the axial movements of the shaft are limited.

JAMES R. BENFORD.

REFERENCES CITED

The following references are of record in the file of this patent:

UNITED STATES PATENTS

| Number | Name | Date |
|---|---|---|
| 528,211 | Sedgwick | Oct. 30, 1894 |
| 847,858 | Ware | Mar. 19, 1907 |
| 1,123,583 | Patterson | Jan. 5, 1915 |
| 1,772,372 | Tierney | Aug. 5, 1930 |
| 1,983,962 | Barber et al. | Dec. 11, 1934 |

FOREIGN PATENTS

| Number | Country | Date |
|---|---|---|
| 496 | Great Britain | Feb. 6, 1878 |
| 304,503 | Germany | Mar. 20, 1918 |